United States Patent [19]

Kennedy

[11] Patent Number: 5,113,446
[45] Date of Patent: May 12, 1992

[54] STEREO BLEND CONTROLLER FOR FM RECEIVERS

[75] Inventor: John F. Kennedy, Garden City, Mich.

[73] Assignee: Ford Motor Company, Dearborn, Mich.

[21] Appl. No.: 631,305

[22] Filed: Dec. 17, 1990

[51] Int. Cl.⁵ .............................................. H04H 5/00
[52] U.S. Cl. ...................................... 381/10; 381/13
[58] Field of Search ................................... 381/10, 13

[56] References Cited

U.S. PATENT DOCUMENTS

| | | |
|---|---|---|
| 3,952,161 | 4/1976 | Gilbert et al. |
| 4,216,353 | 8/1980 | Fish, Jr. ............................ 381/10 |
| 4,646,348 | 2/1987 | Jett, Jr. |
| 4,688,254 | 4/1987 | Ecklund. |
| 4,694,500 | 9/1987 | Tazaki et al. |
| 4,710,958 | 12/1987 | Tazaki ............................... 381/10 |
| 4,881,274 | 11/1989 | Tazaki et al. ..................... 381/13 |
| 4,914,715 | 4/1990 | Miyata. |
| 4,959,859 | 9/1990 | Manlove et al. |

*Primary Examiner*—Forester W. Isen
*Assistant Examiner*—Nina Tong
*Attorney, Agent, or Firm*—Mark Mollon; Roger L. May

[57] ABSTRACT

The stereo separation provided by a radio receiver is controlled in dependence on the radio frequency environment at the receiver antenna. The blend curve for determining stereo separation in dependence on the field intensity of a received signal is dynamically shifted to maintain the average magnitude of a blend control signal at a predetermined magnitude if the field intensity is above a threshold. Otherwise the blend control signal follows a lower limit blend curve of predetermined shape.

18 Claims, 2 Drawing Sheets

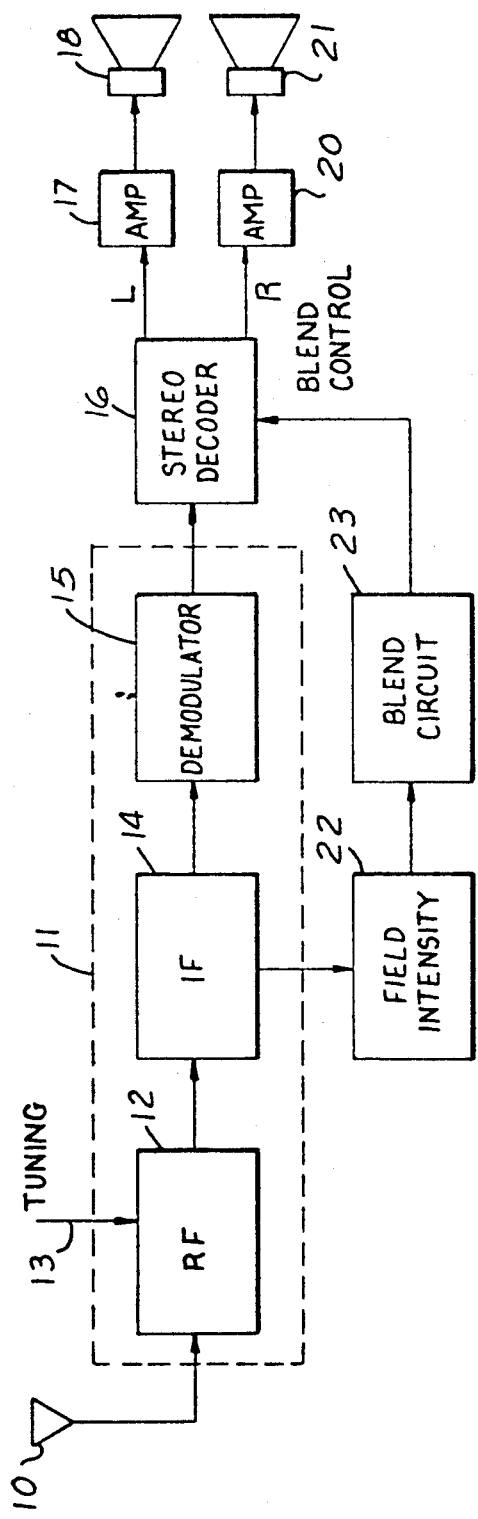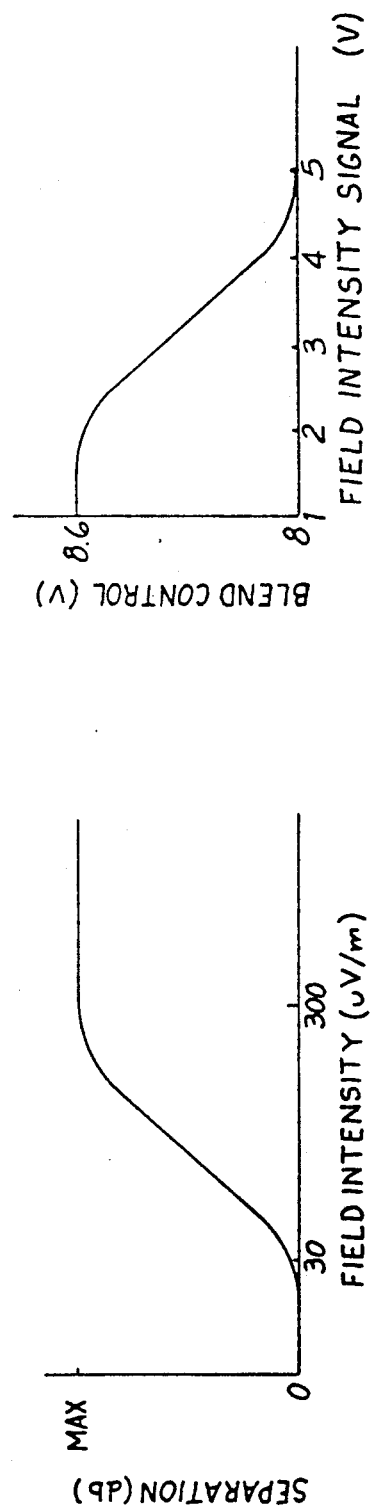

STEREO BLEND CONTROLLER FOR FM RECEIVERS

BACKGROUND OF THE INVENTION

The present invention relates in general to stereophonic radio receivers, and more specifically to a stereo blend controller for changing the stereo separation characteristic in response to the average RF environment at the receiving antenna.

FM stereo broadcasting involves the transmission of a left plus right (L+R) signal and a left minus right (L−R) signal. The left plus right signal is the only one recovered in monophonic receivers. Stereo receivers recover both the left plus right and the left minus right signals and then add these signals to form the left stereo signal and subtract the signals to form the right stereo signal.

In order to generate an acceptable stereo audio output, the RF broadcast signal must be received at a field intensity greater than some minimum field intensity (e.g., 30 μV). For field intensities less than the minimum, only a monophonic signal is generated in the receiver in order to avoid the noise that would result from attempting to decode a weak stereo signal. For field intensities greater than the minimum but less than a higher field intensity (e.g., 300 μV) where full stereo separation can be achieved, partial stereo (i.e., a blend of stereo and mono signals) is generated by the receiver.

Shifts in stereo separation greater than some particular level and at some particular rate of change can be heard by a listener and are to be avoided. Thus, it is advisable to vary the stereo blend gradually so as not to produce objectionable sounds.

Conventional receivers control stereo separation with circuitry in the stereo decoder for variably attenuating the L−R signal. The amount of stereo blend is determined by the field intensity at the antenna of the RF broadcast signal being received. A fixed relationship defines the magnitude of a blend control signal to the stereo decoder in dependence on the field intensity signal. Thus, there is no stereo separation if field intensity is below a first predetermined value, increasing separation as field intensity increases, and substantially full stereo separation if field intensity is above a second predetermined value.

The relationship between field intensity and the amount of attenuation of the L−R signal to achieve a desired stereo separation is known as a blend curve. Field intensity, or field strength, is the effective electric field strength caused by a radio wave at a point in the path of the radio wave. Under certain conditions, such as the occurrence of multipath distortion, field intensity fluctuates rapidly. Multipath distortion is caused when signals following direct and indirect (e.g., reflected) paths from the transmitter to a receiver interfere at the receiver. The blend curve includes a gradual slope so that field intensity fluctuations from multipath distortion do not cause rapid variations in the stereo separation, thereby avoiding phase distortions in the audio output heard by the listener. Nevertheless, the blend curve must reach full separation by some level of field intensity and cannot provide a shape having only a gradual slope for all field intensities.

The fixed blend curve of the prior art is optimized to some model of typical receiving conditions in terms of normal field intensity and severity of multipath. Thus, a blend curve may be optimized for an urban area characterized by strong field intensities (because of the proximity to the transmitting antenna) and by strong multipath (because of reflections by buildings). For these assumed conditions, a blend curve can be shaped such that the blend control signal operates most of the time at a portion of the blend curve having a gradual slope. Stereo performance is then less than optimal for other conditions, however. For received signals having a different average field intensity, stereo blend may be operating at a point in the blend curve not having a gradual slope so that multipath does cause phase distortions. Furthermore, optimizing a blend curve for high field intensities can result in suppressing the reception of stereo at field intensities that while they are lower could still support stereo reception.

SUMMARY OF THE INVENTION

It is a principal object of the present invention to control stereo blend in a radio receiver in a manner which adapts to the RF receiving environment at the antenna.

It is a further object of the invention to provide a method and apparatus for controlling stereo blend so as to always achieve a favorable stereo effect with minimum distortion.

It is another object of the invention to provide a blend curve which is dynamically adjusted in response to the average field intensity of a received stereo broadcast as long as average field intensity is above a predetermined minimum.

These and other objects are achieved using a stereo blend controller which maintains its average stereo separation at a predetermined separation, preferably slightly less than full stereo separation. The shape of a blend curve is maintained while the location of the curve along a field intensity axis is shifted. For a large range of field intensity, the blend curve is always located in an optimal position such that a receiver is operated at a point in the blend curve where a favorable stereo separation is maintained and where changes in field intensity corresponding to multipath conditions do not create noticeable phase distortion. A lower field intensity limit is preferably provided below which the blend curve cannot be shifted.

In a preferred embodiment of the invention, the field intensity signal into a blend curve generator is variably attenuated in order to maintain the average magnitude of a blend control signal at a predetermined magnitude. A curve shifter includes a two-mode (integral-derivative) controller which drives a variable attenuator to reduce any difference between the blend control signal and the predetermined magnitude. The crossover point of the two-mode controller is selected such that multipath induced changes in field intensity do not substantially affect the variable attenuation.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 1 is a block diagram of a radio receiver according to the present invention.

FIG. 2 is a plot showing stereo separation versus field intensity at the antenna as employed in a conventional receiver.

FIG. 3 is a plot showing blend control signal voltage versus a measured field intensity signal obtained in the receiver to achieve the conventional stereo separation of FIG. 2.

DETAILED DESCRIPTION OF PREFERRED EMBODIMENT

Figure 4:
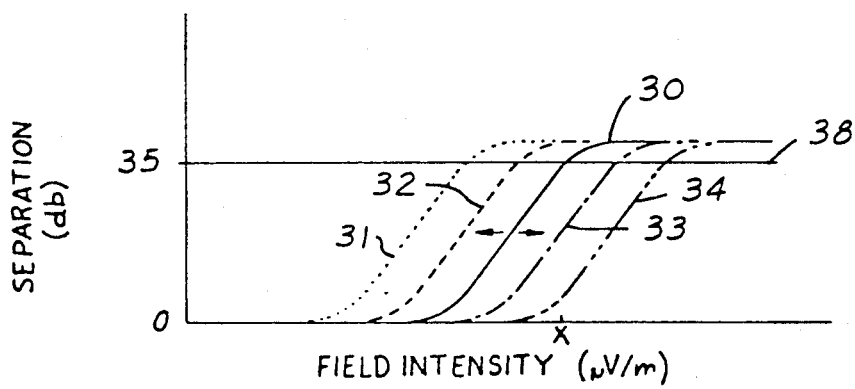
FIG. 4 is a plot showing the nonfixed blend curve according to the present invention.

A receiver in accordance with the present invention is shown in FIG. 1 to include an antenna 10 for receiving FM stereo broadcast radio frequency (RF) signals connected to a superheterodyne receiver block 11. An RF block 12 receives antenna signals from antenna 10 and a tuning command on a control line 13 from a receiver controller such as a microprocessor (not shown). RF block 12 mixes the desired broadcast signals with a mixing signal to produce intermediate frequency signals which are provided to an IF block 14. The intermediate frequency signals are bandpass filtered and amplified in IF block 14. A demodulator 15 receives the IF signals from IF block 14 and recovers the originally broadcast stereo signals including a left plus right (L+R) signal at baseband and a left minus right (L−R) signal which is on a suppressed 38 KHz subcarrier.

A stereo decoder 16 receives the L+R and L−R signals. The left minus right signals are mixed to baseband in stereo decoder 16 using a 19 KHz pilot signal which is also transmitted with the stereo signals. By separately adding and subtracting the L+R and L−R signals, left and right stereo signals are generated which are provided to an amplifier 17 connected to a speaker 18 and to an amplifier 20 connected to a speaker 21, respectively.

Stereo decoder 16 is responsive to a blend control signal for implementing a desired amount of stereo separation. Stereo decoder 16 may be comprised, for example, of the LA3375 stereo decoder manufactured by Sanyo. Stereo decoder 16 may, for example, provide maximum separation when the blend control signal is at a minimum (e.g., +8 volts) corresponding to no attenuation of the left minus right signal in the decoder. Decoder 16 provides no stereo separation (full attenuation of the L−R signal) when the blend control signal is at a maximum value, such as +8.6 volts.

A level detector 22 is connected to IF block 14 for measuring the field intensity of the received FM stereo broadcast signal. As is known in the art, level detector 22 may generate the sum of the detected levels from a plurality of intermediate frequency stages in IF block 14. In the preferred embodiment, the field intensity signal has a magnitude of about +1 volt for field intensities at the antenna less than or equal to about 1 μV and approximately linearly increasing to a maximum of +5 volts for field intensities greater than or equal to about 20 mV.

The field intensity signal from level detector 22 is provided to a blend circuit 23 which generates the blend control signal. Blend circuit 23 implements a blend curve which is dynamically positioned in the present invention to provide an average blend control signal substantially equal to a predetermined voltage.

Prior art blend circuits provide a fixed blend curve as shown in FIGS. 2 and 3. Thus, a minimum separation and a maximum blend control voltage result with field intensity less than a first predetermined value, e.g., 30 μV. At a second predetermined field intensity, such as about 300 μV, separation is at a maximum and the blend control voltage is at about zero volts. Maximum stereo separation provided by a typical stereo decoder is about 40 dB, although the average listener perceives full stereo at about 20 dB of separation.

Field intensities encountered during normal radio use range from several microvolts to tens of millivolts. Using the prior art fixed blend curve, situations can arise where stereo separation is unnecessarily prevented or where multipath conditions introduce phase distortion from fluctuations in the blend control signal.

The present invention solves the foregoing problems by employing a shifting blend curve as shown in FIG. 4. A position 30 of the blend curve is optimized to a particular field intensity x. If average field intensity decreases, then the blend curve is shifted to the left as shown at positions 31 and 32. If the average field. Intensity of the received broadcast signal increases, then the blend curve is shifted to the right as shown at curves 33 and 34. The shifting of the blend curve is controlled such that a predetermined stereo separation line 38 intersects the blend curve at a point corresponding to the average field intensity of the received broadcast signal. For example, maximum stereo separation is typically about 40 dB (i.e., the ratio of the signal caused in one channel to the signal caused in the other channel resulting from the transmitted signal of the other channel). The predetermined separation is selected to be slightly less than 40 dB (e.g., 35 dB) in order to allow closed loop control of actual stereo separation. This reduced level of separation is indistinguishable by the listener from full 40 dB separation. Furthermore, the slope of the blend curve at 35 dB has the optimal value to avoid multipath induced phase distortion.

Figure 5:
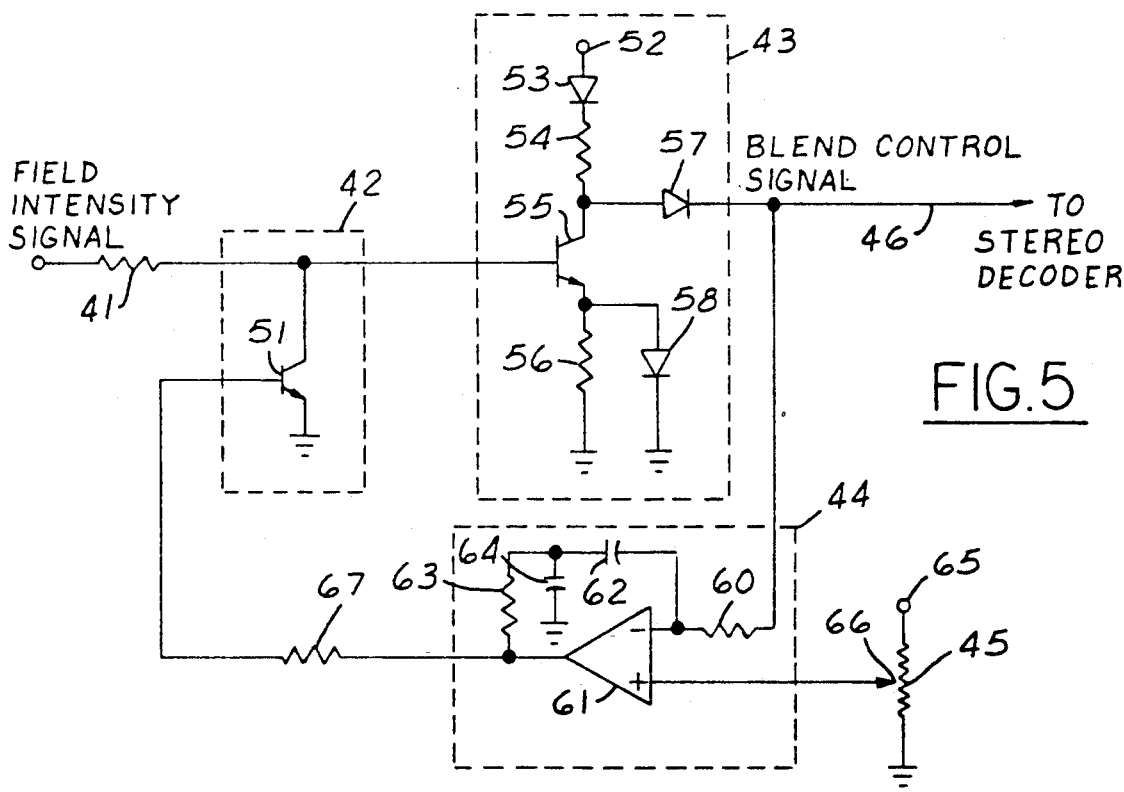
FIG. 5 is a schematic diagram showing blend controller apparatus according to the present invention.

The blend circuit of the present invention is shown in greater detail in FIG. 5. The field intensity signal is coupled to a resistor 41 which in turn is connected to a variable attenuator 42. The output of attenuator 42 is connected to the input of a blend curve generator 43 which produces the blend control signal that is provided to a line 46 leading to the stereo decoder. The blend control signal is also provided to an input of a two-mode integral-derivative controller 44. Another input of controller 44 is connected to a reference voltage potentiometer 45. Controller 44 generates a correction signal which is coupled to the input of variable attenuator 42 through a resistor 67. Thus, controller 44 counteracts any difference between the average blend control signal and the predetermined magnitude from potentiometer 45 but with a slow response time so that any rapid changes in field intensity induced by multipath are not counteracted.

Considering FIG. 5 in more detail, variable attenuator 42 is comprised of a transistor 51 having its collector connected to resistor 41 and its emitter connected to ground. Thus, a portion of the field intensity signal is shunted away to ground depending on the base drive aPPlied to transistor 51. The resistance value of resistor 41 controls the dynamic range over which transistor 51 can affect the field intensity signal. In other words, resistor 41 sets the limits for shifting of the blend curve.

Blend curve generator 43 includes a terminal 52 for receiving a reference voltage (e.g., 12 volts). A diode 53 has its anode connected to terminal 52 and has its cathode connected to a resistor 54. Resistor 54 is further connected to the collector of a transistor 55 and the anode of a diode 57. Transistor 55 has its base connected to the attenuated field intensity signal from variable attenuator 42. It has its emitter connected to one side of a resistor 56 and the anode of a diode 58. The other side of resistor 56 and the cathode of diode 58 are connected to ground. The cathode of diode 57 provides the blend control signal, i.e., the output of blend curve generator 43.

Blend curve generator 43 inverts the attenuated field intensity signal, i.e., a low field intensity signal produces a high blend control signal and vice-versa. The shape (i.e., curvature and slope) of the blend curve is determined primarily by diodes 53, 57, and 58.

Controller 44 has the blend control signal coupled to one side of a resistor 60. The inverting input of an op amp 61 is connected to the other side of resistor 60 and to one side of a capacitor 62. The other side of capacitor 62 is connected to one side of a resistor 63 and one side of a capacitor 64. The other side of resistor 63 is connected to the output of op amp 61 and the other side of capacitor 64 is connected to ground. Potentiometer 45 has one end connected to a reference voltage terminal 65 and the other end connected to ground. A potentiometer tap 66 provides a predetermined reference voltage to the noninverting input of op amp 61. This reference voltage equals the value of the blend control signal which corresponds to the desired optimal stereo separation and may be about +8.15 volts for a separation of 35 dB in the present example.

Controller 44 acts as an integrator by virtue of capacitor 62 and as a differentiator by virtue of capacitor 64. This two-mode controller maintains the blend control signal at a voltage equal on average to the voltage provided from potentiometer tap 66 as long as closed loop control is maintained. Component values for controller 44 are selected to result in a crossover point between integration and differentiation at about 200 hertz. This maintains a substantially constant average blend control voltage while permitting quick response to multipath fluctuations.

The output signal of op amp 61 is a correction signal provided to transistor 51 which attempts to maintain the input voltage to blend curve generator 43 at a predetermined voltage. For example, a field intensity signal for a typical receiver may range from +1 volt for a weak signal to +5 volts for strong signals. As previously mentioned, a predetermined blend control voltage of about 8.15 volts is to be maintained on average. The input voltage to blend curve generator 43 which produces the 8.15 volt blend control signal, in this example, is about 3 volts. Thus, for a field intensity signal over 3 volts, transistor 51 is driven into conduction to the extent necessary to reduce the input voltage to blend curve generator 43 to a magnitude of 3 volts. If the field intensity signal is below 3 volts, then transistor 51 is made nonconductive and the blend curve is at its lower limit.

Figure 6:
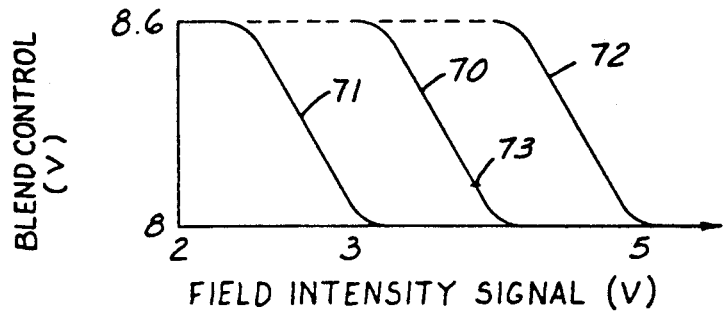
FIG. 6 shows a plot of blend control signal voltage versus the measured field intensity signal provided by the present invention.

FIG. 6 shows a blend curve 70 corresponding to an average field intensity between 3 and 5 volts. A blend curve 71 corresponds to the lower limit for shifting the blend curve when field intensity is below 3 volts and results when transistor 51 of FIG. 5 is nonconducting. A blend curve 72 corresponds to a field intensity signal of 5 volts and corresponds to the maximum shift to the right of the blend curve. The actual position of the blend curve is selected so that an average blend control voltage shown at point 73 is obtained. Thus, stereo separation is maintained at a predetermined magnitude whenever the field intensity signal is above a threshold and follows a lower limit blend curve whenever the field intensity signal is below the threshold.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A stereo blend controller for a stereo radio receiver which converts stereo broadcast signals to blended-stereo audio signals, said controller comprising:
   level detecting means for generating a field intensity signal indicative of the intensity at which a stereo broadcast signal is received;
   blend curve generator means coupled to said level detecting means for generating a blend control signal according to a blend curve and said field intensity signal; and
   curve shift means coupled to said level detecting means and said blend curve generator means for substantially maintaining the average magnitude of said blend control signal at a predetermined magnitude if said field intensity signal is above a threshold.

2. The controller of claim 1 wherein said curve shift means includes a variable attenuator for variably attenuating said field intensity signal to maintain said average.

3. The controller of claim 1 wherein said curve shift means includes an integral-derivative controller for comparing said blend control signal with said predetermined magnitude to generate a correction signal.

4. The controller of claim 3 wherein said curve shift means further includes a variable attenuator for variably attenuating said field intensity signal in response to said correction signal to maintain said average.

5. The controller of claim 1 wherein said predetermined magnitude corresponds to a separation less than the maximum stereo separation.

6. The controller of claim 5 wherein said predetermined magnitude provides about 35 dB of stereo separation.

7. The controller of claim 1 wherein said curve shift means includes a lower limit for shifting said blend curve.

8. A stereo radio receiver for converting stereo broadcast signals to blended-stereo audio signals comprising:
   demodulating means for receiving, amplifying, and demodulating a stereo broadcast signal;
   level detecting means coupled to said demodulating means for generating a field intensity signal indicative of the intensitY at which said stereo broadcast signal is received;
   blend curve generator means coupled to said level detecting means for generating a blend control signal according to a blend curve and said field intensity signal;
   stereo decoder means coupled to said demodulating means and to said blend curve generator means for producing said stereo audio signals having a stereo separation responsive to said blend control signal; and curve shift means coupled to said level detecting means and said blend curve generator means for substantially maintaining the average magnitude of said blend control signal at a predetermined magnitude if said field intensity signal is above a threshold.

9. The receiver of claim 8 wherein said curve shift means includes a variable attenuator for variably attenuating said field intensity signal to maintain said average.

10. The receiver of claim 8 wherein said curve shift means includes an integral-derivative controller for comparing said blend control signal with said predetermined magnitude to generate a correction signal.

11. The receiver of claim 10 wherein said curve shift means further includes a variable attenuator for variably attenuating said field intensity signal in response to said correction signal to maintain said average.

12. The receiver of claim 8 wherein said predetermined magnitude corresponds to a separation less than the maximum stereo separation.

13. The receiver of claim 12 wherein said predetermined magnitude provides about 35 dB of stereo separation.

14. The receiver of claim 8 wherein said curve shift means includes a lower limit for shifting said blend curve.

15. A stereo radio receiver for converting stereo broadcast signals to blended-stereo audio signals comprising:

demodulating means for receiving, amplifying, and demodulating a stereo broadcast signal;

level detecting means coupled to said demodulating means for generating a field intensity signal indicative of the intensity at which said stereo broadcast signal is received;

curve generator means coupled to said level detecting means for generating a blend control signal in response to said field intensity signal;

stereo decoder means coupled to said demodulating means and to said curve generator means for producing said stereo audio signals having a stereo separation responsive to said blend control signal;

an integral-derivative controller coupled to said curve generator means, said integral-derivative controller comparing said blend control signal with a predetermined magnitude to generate a correction signal; and variable attenuator means coupled to said integral-derivative controller and said level detecting means for attenuating said field intensity signal in response to said correction signal.

16. A method of controlling blend in a stereo radio receiver comprising the steps of:

measuring the field intensity at which a stereo broadcast signal is received;

converting said field intensity into a blend control signal having a voltage determined according to a blend curve having a predetermined shape;

decoding said stereo broadcast signals to have a stereo separation determined by said blend control signal; and maintaining said blend control signal at a predetermined average magnitude to provide a predetermined average separation if said field intensity is above a threshold.

17. A method of controlling blend in a stereo radio receiver comprising the steps of:

measuring the field intensity at which a stereo broadcast signal is received;

converting said field intensity into a blend control signal according to a blend curve having a predetermined shape;

decoding said stereo broadcast signals to have a stereo separation determined by said blend control signal;

attenuating said field intensity signal prior to conversion into said blend control signal by an amount to cause the average magnitude of said blend control signal to be maintained at a predetermined magnitude.

18. The method of claim 17 further comprising the step of:

integrating and differentiating said blend control signal to control the amount of said attenuation of said field intensity signal.

* * * * *